United States Patent Office 3,636,066
Patented Jan. 18, 1972

3,636,066
PROCESS FOR THE MANUFACTURE OF ACRYLONITRILE BY AMMOXIDATION
Keisho Yamada, Shigeki Nagai, Kyoji Odan, Yasuo Nakamura, and Mikio Hidaka, Ube-shi, Japan, assignors to Ube Industries, Ltd., Ube-shi, Japan
No Drawing. Filed Mar. 5, 1969, Ser. No. 804,655
Int. Cl. C07c *121/02*
U.S. Cl. 260—465.3         3 Claims

ABSTRACT OF THE DISCLOSURE

In the process of manufacturing acrylonitrile wherein propylene, ammonia and oxygen are contacted with a solid oxidizing catalyst in the vapor phase at a temperature in the range of 400–600° C., the improved method which comprises using as said solid catalyst that which consists essentially of (A) a bismuth antimonate in which the atomic ratio of bismuth to antimony is 1:1, and
(B) an oxide of a metal selected from the group consisting of tungsten, uranium, molybdenum, vanadium, tin and iron;

the weight ratio of said bismuth antimonate to said oxide being in the range of 95:5–50:50.

---

This invention relates to a process for the manufacture of acrylonitrile from propylene by ammoxidation and, in particular to a process by which acrylonitrile can be obtained with high selectivity by reacting propylene with ammonia and oxygen in the presence of a catalyst of new composition.

Numerous proposals have been made in the past regarding the method of producing acrylonitrile by the so-called ammoxidation of propylene which involves the vapor phase oxidation of propylene with either oxygen or air in the presence of ammonia. For example, U.S. Pat. 2,904,580 to Idol discloses a method of manufacturing acrylonitrile by the ammoxidation of propylene using a catalyst selected from the group consisting of the bismuth, tin and antimony salts of phosphomolybdic and molybdic acids and bismuth phosphotungstate.

However, by-products such as acetonitrile and cyanic acid are each formed in amounts of about 10% based on the acrylonitrile, the principal product, when the aforesaid catalysts are used. In consequence, not only does the selectivity for acrylonitrile decline, but there is also the drawback that it becomes difficult to obtain acrylonitrile of high purity commercially advantageously by separation and removal of the foregoing by-products from the acrylonitrile.

On the other hand, U.S. Pat. 3,269,957 discloses a catalyst composition consisting of antimony tetroxide admixed with stannic oxide or consisting essentially of antimony, tin and oxygen, which has been stabilized with up to about 2 mol percent of an oxide of bismuth. It is disclosed that this catalyst can be used in the manufacture of acrylonitrile by the ammoxidation of propylene. Granting that this catalyst is satisfactory with respect to its prolongation of catalytic life, it has the shortcoming that, as in the case with previously described catalyst, its selectivity for acrylonitrile is low.

Thus, as indicated, the catalysts that have been used heretofore in the manufacture of acrylonitrile by the ammoxidation of propylene are generally low in their selectivity for acrylonitrile and hence are not yet fully satisfactory from the standpoint of the commercial manufacture of acrylonitrile.

We found that in the case of a catalyst which was obtained by especially choosing a bismuth antimonate in which the atomic ratio of bismuth to antimony is about 1:1 and combining this with an oxide of a metal selected from the group consisting of tungsten, uranium, molybdenum, vanadium, tin and iron, the by-products formed during the ammoxidation of propylene, such as acetonitrile, propionitrile, cyanic acid, acrolein, carbon monoxide and carbon dioxide were controlled to very minute amounts and acrylonitrile was obtained at a high selectivity.

According to the present invention, in the process of manufacturing acrylonitrile by contacting propylene, ammonia and oxygen with a solid oxidizing catalyst in the vapor phase at a temperature of 400–600° C., a method is provided which is characterized in that said oxidizing catalyst consists essentially of (A) a bismuth antimonate in which the atomic ratio of bismuth to antimony is 1:1, and
(B) an oxide of a metal selected from the group consisting of tungsten, uranium, molybdenum, vanadium, tin and iron, and wherein the weight ratio of bismuth antimonate to the metal oxide is in the range of 95:5–50:50.

The bismuth antimonate, the first component (A) of the present invention, as indicated by its formula $BiSbO_4$, is a component in which the atomic ratio of bismuth to antimony is substantially equal to 1. As antimonates of bismuth there also exist compounds other than the compound of the formula $BiSbO_4$ depending upon the atomic ratio of bismuth to antimony, i.e., compound having the formulas $Bi(SbO_3)_3$ and $(BiO)_3SbO_4$ are also known. However, the use of such antimonates of bismuth without the scope of the present invention will not bring about the high selectivity for acrylonitrile such as shown by the invention catalyst. Needless to say, the presence as ineffective components in the first component of the invention catalyst of such compounds of the foregoing formulas $Bi(SbO_3)_3$ and $(BiO)_3SbO_4$, in a slight amount, say, less than about 10% by weight based on the $BiSbO_4$ is of no interference at all.

The second component (B) of this invention is a metal oxide selected from the group consisting of tungsten oxide $(WO_3)$, uranium oxide $(UO_3, U_3O_8)$, molybdenum oxide $(MoO_3)$, vanadium oxide $(V_2O_5)$, stannic oxide $(SnO_2)$ and ferric oxide $(Fe_2O_3)$. Needless to say, these metal oxides can be used either alone or in combinations of a plurality thereof. When considered from the selectivity for acrylonitrile and the conversion of propylene, tungsten oxide and molybdenum oxide are most to be preferred of these second components of the present invention, with vanadium oxide being next preferred.

Although the selectivity for acrylonitrile from propylene is very low when either of the catalyst components of the invention is used alone, it becomes possible to obtain acrylonitrile from propylene with a high selectivity reaching as high as 80% or more by the use of the combination of these two components. Thus, the proportion in which the bismuth antimonate, the component (A), and the metal oxide, the component (B), are used is in a weight ratio of A:B=95:5–50:50, especially preferred being a range of 90:10–70:30.

The invention catalyst can be prepared in the following manner. A soluble salt of antimony, e.g., antimony trichloride or antimony pentachloride, is dissolved by adding concentrated hydrochloric acid, to which is then added water to effect hydrolysis and formation of a precipitate. Next, by adding ammonia water antimony trioxide is completely salted out. When a nitric acid solution of bismuth nitrate is added to the so obtained antimony trioxide such that the atomic ratio of bismuth to antimony becomes 1:1 and thereafter the mixture is evaporated to dryness until the evolution of nitrogen dioxide ceases followed by calcination, bismuth antimonate is obtained. The calcination is preferably carried out at a temperature usually of 300–700° C., and particularly 540–600° C., for 5–30 hours, and particularly 5–20 hours. A temperature higher than those indicated is not desirable, since the specific surface area of the catalyst declines to result in a decline in the activity of the catalyst. To the bismuth antimonate of the formula $BiSbO_4$ obtained in this manner is added a single or plurality of classes of the aforesaid tungsten oxide, uranium oxides, molybdenum oxide, vanadium oxide, stannic oxide or ferric oxide, following which the mixture is kneaded into paste form with water using a pulverizer. This is followed by drying to obtain the catalyst.

While as the metal oxide to be used as the second component those that are available commercially as metal oxides can be used as obtained, it is preferred that fresh metal oxides obtained by hydrolysis of the previously noted soluble salts of metals should be used.

The hereinbefore described catalyst to be used in the invention process can be used supported in varied proportions on various classes of carriers. As carriers, those which are relatively inert such as silica gel, carborundum, alumina or silica-alumina are preferred, but aside from these also useable are kaoline, pumice and diatomaceous earth. These carriers can be used in a range of 10–90% by weight based on the overall weight.

The invention catalysts will vary depending upon the manner of combination of the components and their conditions of preparation but, generally speaking, they possess specific surface areas of 1–3 m.²/g.

There is no particular restriction as to the size of the catalyst particles. Any size which depending upon whether the catalyst is to be used as a fluidized bed or as a fixed bed is known per se can be used. Further, it is possible to provide the catalyst with adequate mechanical strength by molding it into pellet or granular form by means of the usually employed techniques of molding catalysts. The activity of the catalyst is not affected by the type of the molding method employed.

According to the invention process, except that the hereinbefore described catalyst is used, the ammoxidation of propylene can be carried out in accordance with the processing conditions which per se are known.

The propylene used as the starting material in the invention process need not necessarily be of high purity. For instance, propane, ethylene and ethane, which may be contained in the propylene, are effective as diluents. However, the butenes and acetylenes should preferably be removed so far as possible, since they are likely to cause unnecessary side reactions.

Oxygen of high purity is not necessarily required as the oxygen source, and usually the use of air will do for reasons of economy. The amount of oxygen fed is suitably 0.8–3.0-fold molar quantity of the propylene, a range of 1.5–2.0-fold molar quantity being especially convenient. On the other hand, the amount of ammonia fed is preferably in the range of 0.5–3.0-fold molar quantity, and particularly 0.8–1.2-fold molar quantity of the propylene.

Further, nitrogen, carbon dioxide and steam can also be added as diluent gases. Steam not only is effective in this respect but also has the effect of enhancing the selectivity for the intended acrylonitrile and of prolonging the activity of the catalyst by checking the decline of the catalytic activity. Hence, the addition of at least one mol of steam per mol of the propylene is desirable.

A reaction temperature of 400–600° C. is suitable, and particularly preferred is a temperature ranging from 420° to 500° C.

A contact time of 0.5–40 seconds, and particularly 2–20 seconds, is preferred.

While the reaction is usually carried out at atmospheric pressure, it is also possible to conduct the reaction with the application of a pressure of low degree or under reduced pressure.

Although the invention process can be readily carried out by employing the per se known vapor phase reaction apparatus which use the catalyst as a fixed, moving or fluidized bed, the use of a reaction apparatus of the fixed bed type is of particular advantage from the standpoint of the life of the catalyst.

The recovery of the intended acrylonitrile from the reaction product can be accomplished in the following manner. The effluent gas from the reaction apparatus is contacted with either cold water or other solvents of acrylonitrile to extract the acrylonitrile, following which this is submitted to fractional distillation. It is, of course, possible to treat the effluent gas with an aqueous acid solution, say, aqueous sulfuric acid solution for neutralizing the excess ammonia prior to extraction of the acrylonitrile. According to the invention process, acrylonitrile can be obtained from propylene at a very high selectivity. In addition, the formation of by-products such as acetonitrile, propionitrile, cyanic acid, acrolein, carbon monoxide and carbon dioxide is small. Hence, the purification steps can be made much simpler than that of the conventional methods, and furthermore acrylonitrile of high purity can be provided at low cost.

For a better understanding of the invention, the following examples and comparisons are given.

EXAMPLE 1

116 grams of antimony trichloride was dissolved by adding 12 cc. of hydrochloric acid, after which water was added to effect hydrolysis and formation of a precipitate. 76.7 cc. of ammonia water was then added to completely salt out the precipitate as antimony trioxide which was separated by filtration and water-washed. The so obtained antimony trioxide was placed in an evaporating dish, to which was then added a solution of 246 grams of bismuth nitrate in 46 cc. of nitric acid of 60–62% concentration, following which this mixture was evaporated to dryness until the evolution of nitrogen dioxide ceased and thereafter calcined for 16 hours at 500° C. in a U-shaped calcination furnace heated with a salt bath while flowing air therethrough at the rate of 100 cc. per minute. This was followed by the further addition of 50 grams of tungsten oxide to the calcined product, following which this mixture was kneaded into paste form with water using a pulverizer. This paste was dried at 130° C. for 16 hours and thereafter screened 14–20 mesh to obtain the catalyst.

The composition of the catalyst obtained by the hereinabove described operation was of a weight ratio of bismuth antimonate to tungsten oxide ($WO_3$) of 80:20. Fifteen cc. of this catalyst was packed in a U-shaped stainless steel reaction tube having an inside diameter of 16 mm., and the reaction tube was then placed in a salt bath to maintain the temperature inside the tube at 470° C.

A gas mixture consisting of propylene, ammonia, steam and air in a mole ratio of 1:1:2:7.5 was passed through the reaction tube at the rate of 80.5 cc. per minute and reacted. The contact time was 11.18 seconds. The conversion of the propylene was 73.7% and the selectivity for the several products was as shown in Table I.

TABLE I

| Product: | Selectivity (percent) |
|---|---|
| Acrylonitrile | 87.8 |
| Acetonitrile | 5.2 |
| Acrolein | 0.5 |
| Cyanic acid | 2.7 |

Only a trace of propionitrile and acetone was formed.

Comparison 1

The ammoxidation of propylene was carried out under identical conditions as in Example 1, except that the catalyst used in an amount of 15 cc. was one prepared exactly as in Example 1 but without the addition of tungsten oxide (i.e. BiSbO$_4$ alone screened to 14–20 mesh). The conversion of the propylene was 25.5% and the selectivity for acrylonitrile was 10.9%. The formation of acetonitrile, cyanic acid, acrolein and propionitrile was in trace amounts.

Comparison 2

A catalyst consisting of tungsten oxide alone was prepared by kneading it into paste form with water using a pulverizer, after which the pasty tungsten oxide was dried at 130° C. for 16 hours and thereafter screened to 14–20 mesh. The ammoxidation of propylene was carried out as in Example 1, except that as catalyst the tungsten oxide alone prepared as described above was used. The conversion of the propylene reached as high as 90%, but it was confirmed that the selectivity for acrylonitrile was only about 15%.

EXAMPLES 2–6

The ammoxidation of propylene was carried out under identical conditions as in Example 1, except that the weight ratio of the bismuth antimonate to tungsten oxide in the catalyst was carried.

The results obtained are shown in Table II.

TABLE II

| Ex. No. | Catalyst composition (wt. percent) | | Conversion of propylene (percent) | Selectivity (percent) | | | |
|---|---|---|---|---|---|---|---|
| | Bismuth antimonate | Tungsten oxide | | Acrylonitrile | Acetonitrile | Acrolein | Cyanic acid |
| 2 | 85 | 15 | 69.2 | 86.2 | 4.1 | 1.1 | 3.0 |
| 3 | 77 | 23 | 75.1 | 84.2 | 3.7 | 0.6 | 2.2 |
| 4 | 75 | 25 | 77.5 | 90.2 | 2.4 | 0.5 | 1.1 |
| 5 | 70 | 30 | 76.0 | 85.3 | 4.1 | 2.1 | 1.9 |
| 6 | 60 | 40 | 78.0 | 80.8 | 3.5 | 3.0 | 1.2 |

Comparison 3

The ammoxidation of propylene was carried out as in Example 1, except that a weight ratio of the bismuth antimonate (BiSbO$_4$) to tungsten oxide of 20:80 was used. The conversion of propylene reached as high as 80%, but the selectivity for acrylonitrile was only 32%.

EXAMPLES 7–9

Catalysts consisting of bismuth antimonate and uranium oxide were prepared by adding to bismuth antimonate prepared by operating as in Example 1, uranium oxide obtained by dissolving uranyl nitrate in absolute alcohol and heating the mixture to form uranyl hydroxide, followed by separating this by filtration and heating. The addition of the uranium oxide to the bismuth antimonate was in such amounts that the weight ratios of bismuth antimonate to uranium oxide would become 80:20, 75:25 and 70:30.

bath and the temperature inside the tube was maintained at 470° C.

A gas mixture consisting of propylene, ammonia, steam and air in a mole ratio of 1:1:1:7 was passed Fifteen cc. of the catalysts prepared as hereinabove described were packed in a U-shaped stainless steel reaction tube, following which the tube was placed in a salt through the reaction tube at the rate of 80 cc. per minute and reacted. The contact time was 11.25 seconds. The results obtained are shown in Table III.

TABLE III

| Ex. No. | Catalyst composition (wt. percent) | | Conversion of propylene (percent) | Selectivity (percent) | | | |
|---|---|---|---|---|---|---|---|
| | Bismuth antimonate | Uranium oxide | | Acrylonitrile | Acetonitrile | Acrolein | Cyanic acid |
| 7 | 80 | 20 | 56.3 | 75.2 | 3.1 | 1.1 | 2.1 |
| 8 | 75 | 25 | 63.6 | 80.7 | 5.2 | 2.3 | 5.1 |
| 9 | 70 | 30 | 70.7 | 79.4 | 3.4 | 4.1 | 1.6 |

EXAMPLE 10

116 grams of antimony trichloride was dissolved by adding 12 cc. of concentrated hydrochloric acid, after which water was added to effect hydrolysis and formation of a precipitate. 76.7 cc. of ammonia water was then added to completely salt out the precipitate as antimony trioxide which was separated by filtration and water-washed. The so obtained antimony trioxide was placed in an evaporating dish, to which was then added a solution of 246 grams of bismuth nitrate in 46 cc. of nitric acid of 60–62% concentration, following which this mixture was evaporated to dryness until the evolution of nitrogen dioxide ceased and thereafter calcined for 16 hours at 500° C. in a U-shaped calcination furnace heated with a salt bath while flowing air therethrough at the rate of 100 cc. per minute. This was followed by the further addition of 50 grams of molybdenum oxide to the calcined product, following which this mixture was kneaded into paste form with water using a pulverizer. This paste was dried at 130° C. for 16 hours and thereafter screened to 14–20 mesh to obtain the catalyst.

The composition of the catalyst obtained by the hereinabove described operation was of a weight ratio of bismuth antimonate to molybdenum oxide of 80:20. Fifteen cc. of this catalyst was packed in a U-shaped stainless steel reaction tube having an inside diameter of 16 mm., and the reaction tube was then placed in a salt bath to maintain the temperature inside the tube at 470° C.

The gas mixture consisting of propylene, ammonia, steam and air in a mole ratio of 1:1:1:5 was passed through the reaction tube at the rate of 80 cc. per minute and reacted. The contact time was 11.25 seconds. The conversion of the propylene was 54.8% and the selectivity for the several products was as shown in Table IV.

TABLE IV

| Product: | Selectivity (percent) |
|---|---|
| Acrylonitrile | 89.8 |
| Acetonitrile | 3.9 |
| Cyanic acid | 1.1 |
| Acrolein | 1.3 |

Only a trace of propionitrile was formed.

Comparison 4

A catalyst consisting of molybdenum oxide alone was prepared by kneading it into paste form with water using a pulverizer, after which the pasty molybdenum oxide was dried at 130° C. for 16 hours and thereafter screened to 14–20 mesh. The ammoxidation of propylene was carried out as in Example 10, except that as catalyst the molybdenum oxide alone prepared as described above was used. The conversion of the propylene was about 67%, but the selectivity for acrylonitrile was only 32%.

EXAMPLES 11–15

Catalysts prepared by varying the composition (weight) of bismuth antimonate and molybdenum oxide in the range indicated in Table V but otherwise as in Example 10 were used, and the reactions were carried out under identical conditions as described therein. The results obtained are shown in Table V.

TABLE V

| Ex. No. | Catalyst composition (wt. percent) | | Conversion of propylene (percent) | Selectivity (percent) | | | |
|---|---|---|---|---|---|---|---|
| | Bismuth antimonate | Molybdenum oxide | | Acrylonitrile | Acetonitrile | Cyanic acid | Acrolein |
| 11 | 90 | 10 | 58.0 | 80.8 | 3.5 | 1.2 | 0.3 |
| 12 | 85 | 15 | 56.0 | 85.3 | 4.1 | 1.9 | 1.2 |
| 13 | 77 | 23 | 47.5 | 93.2 | 2.4 | 2.0 | 0.5 |
| 14 | 75 | 25 | 45.1 | 84.7 | 1.7 | 1.1 | 3.0 |
| 15 | 70 | 30 | 49.2 | 86.2 | 3.1 | 2.0 | 2.1 |

EXAMPLES 16–18

Catalysts consisting of bismuth antimonate and vanadium oxide were prepared by adding vanadium oxide to bismuth antimonate prepared by operating as in Example 10, the addition of the vanadium oxide to the bismuth antimonate being in such amounts that weight ratios of bismuth antimonate to vanadium oxide would become 90:10, 80:20 and 10:30. Fifteen cc. of the resulting catalysts were packed in a U-shaped stainless steel reaction tube having an inside diameter of 16 mm., following which the tube was placed in a salt bath to maintain the inside temperature of the tube at 470° C.

A gas mixture consisting of propylene, ammonia, steam and air in a mole ratio of 1:1:1:7 was then passed through the reaction tube at the rate of 80 cc. per minute and reacted. The contact time was 11.25 seconds.

The results obtained are shown in Table VI.

TABLE VI

| Ex. No. | Catalyst composition (wt. percent) | | Conversion of propylene (percent) | Selectivity (percent) | | | |
|---|---|---|---|---|---|---|---|
| | Bismuth antimonate | Vanadium oxide | | Acrylonitrile | Acetonitrile | Cyanic acid | Acrolein |
| 16 | 90 | 10 | 52.3 | 83.2 | 5.5 | 3.4 | 0.5 |
| 17 | 80 | 20 | 65.6 | 76.9 | 9.3 | 4.2 | 0.9 |
| 18 | 70 | 30 | 70.5 | 70.8 | 8.5 | 5.1 | 0.3 |

EXAMPLES 19–21

Catalysts consisting of bismuth antimonate and stannic oxide were prepared by adding stannic oxide to bismuth antimonate prepared by operating as in Example 10, the addition of the stannic oxide to the bismuth antimonate being in such amounts that the weight ratios of bismuth antimonate to stannic oxide would become 90:10, 80:20 and 70:30. Fifteen cc. of the resulting catalysts were packed in a U-shaped stainless steel reaction tube having an inside diameter of 16 mm., following which the tube was placed in a salt bath to maintain the inside temperature of the tube at 470° C.

A gas mixture consisting of propylene, ammonia, steam and air in a mole ratio of 1:1:1:7 was then passed through the reaction tube at the rate of 80 cc. per minute and reacted. The contact time was 11.25 seconds. The results obtained are shown in Table VII.

TABLE VII

| Ex. No. | Catalyst composition (wt. percent) | | Conversion of propylene (percent) | Selectivity (percent) | | | |
|---|---|---|---|---|---|---|---|
| | Bismuth antimonate | Stannic oxide | | Acrylonitrile | Acetonitrile | Cyanic acid | Acrolein |
| 19 | 90 | 10 | 42.6 | 79.5 | 4.2 | 1.2 | 2.3 |
| 20 | 80 | 20 | 50.5 | 80.6 | 6.5 | 0.5 | 1.3 |
| 21 | 70 | 30 | 55.3 | 75.6 | 3.5 | 1.5 | 1.0 |

EXAMPLE 22

A catalyst consisting of bismuth antimonate and ferric oxide was prepared by adding ferric oxide to bismuth antimonate obtained by operating as in Example 10, the addition of the ferric oxide to the bismuth antimonate being in such an amount that the weight ratio of bismuth antimonate to ferric oxide would become 80:20. Ten cc. of the so obtained catalyst was packed in a U-shaped stainless steel reaction tube having an inside diameter of 16 mm., after which the tube was placed in a salt bath to maintain the inside temperature of the tube at 470° C.

A gas mixture consisting of propylene, ammonia, steam and air in a mole ratio of 1:1:1:5 was then passed through the reaction tube at the rate of 80 cc. per minute and reacted. The contact time was 7.5 seconds. The conversion of the propylene was 32% and the selectivity for the several products was as shown in Table VIII.

TABLE VIII

| Product: | Selectivity (percent) |
|---|---|
| Acrylonitrile | 75.6 |
| Acetonitrile | 2.5 |
| Cyanic acid | 1.3 |
| Acrolein | 2.1 |

It should be apparent upon consideration of the foregoing examples and comparisons that acrylonitrile can be obtained at a high selectivity in only those instances where the bismuth antimonate and either tungsten oxide, molybdenum oxide, vanadium oxide, stannic oxide, uranium oxides or ferric oxide are used in proportions the range of which has been specified in the appended claims.

We claim:
1. In a process for the production of acrylonitrile wherein propylene, ammonia and oxygen are contacted with a solid oxidizing catalyst in the vapor phase at a temperature within the range of 400–600° C., the improvement wherein said solid oxidizing catalyst consists essentially of
  (A) bismuth antimonate of the formula $BiSbO_4$, and
  (B) a metal oxide selected from the group consisting of $WO_3$, $UO_3$, $U_3O_8$, $MoO_3$, $V_2O_5$, $SnO_2$, and $Fe_2O_3$, the weight ratio of said bismuth antimonate to said metal oxide being within the range of 95:5–50:50.

2. The process of claim 1 wherein the weight ratio of said bismuth antimonate to said metal oxide is within the range of 90:10–70:30.

3. The process of claim 1 wherein said bismuth antimonate is obtained by mixing antimony trioxide with an aqueous nitric acid solution of bismuth nitrate such that the atomic ratio of antimony to bismuth is about 1:1 and thereafter calcining said mixture at 300–700° C. for 5–30 hours.

References Cited

UNITED STATES PATENTS

| 3,142,697 | 7/1964 | Jennings et al | 260—465.3 |
| 3,269,957 | 8/1966 | Bethell | 260—465.3 X |
| 3,338,952 | 8/1967 | Callahan et al. | 260—465.3 |
| 3,346,617 | 10/1967 | Hiroki et al. | 260—465.3 |
| 3,431,292 | 3/1969 | Callahan et al. | 260—465.3 |

FOREIGN PATENTS

| 41/3,616 | 2/1966 | Japan | 260—465.3 |

JOSEPH P. BRUST, Primary Examiner

U.S. Cl. X.R.

252—456, 467, 469, 470; 260—604 R